(12) United States Patent
Au et al.

(10) Patent No.: US 9,733,129 B1
(45) Date of Patent: Aug. 15, 2017

(54) MULTISPECTRAL BAND SENSOR

(71) Applicant: Honeywell International Inc., Morris Plains, NJ (US)

(72) Inventors: Kwong Wing Au, Bloomington, MN (US); Barrett E. Cole, Bloomington, MN (US); Christopher S. Larsen, Plymouth, MN (US); Sharath Venkatesha, Minnetonka, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/258,885

(22) Filed: Sep. 7, 2016

Related U.S. Application Data

(60) Provisional application No. 62/314,202, filed on Mar. 28, 2016.

(51) Int. Cl.
*G01J 5/00* (2006.01)
*G01J 5/10* (2006.01)
*G01J 5/08* (2006.01)

(52) U.S. Cl.
CPC ............... *G01J 5/10* (2013.01); *G01J 5/0018* (2013.01); *G01J 5/0803* (2013.01); *G01J 5/0806* (2013.01); *G01J 2005/103* (2013.01)

(58) Field of Classification Search
CPC .......... G01J 5/0014; G01J 5/0862; G01J 5/20; G01J 5/0806; G08B 17/12
See application file for complete search history.

(56) References Cited

U.S. PATENT DOCUMENTS

2013/0009062 A1*  1/2013  Cole ..................... G08B 17/12
                                                        250/342

* cited by examiner

*Primary Examiner* — Kiho Kim
(74) *Attorney, Agent, or Firm* — Brooks, Cameron & Huebsch, PLLC

(57) ABSTRACT

Devices, methods, systems, and computer-readable media for a multiband detector are described herein. One or more embodiments include a multiband detector designed to detect an emission source including a broadband lens, a broadband detector, and a filter that allows electromagnetic radiation entering the system to be filtered into at least two wavelength bands before contacting the broadband detector wherein one or more wavelength bands are used to determine system functionality and wherein one or more other wavelength bands are used to identify the presence of an emission source having a characteristic particular wavelength or wavelength range.

20 Claims, 3 Drawing Sheets

FUNDAMENTAL SCHEMATIC OF FAIL-SAFE FLAME CAMERA

MULTISPECTRAL BAND SENSOR

PRIORITY INFORMATION

This application is a Non-Provisional of U.S. Provisional Application No. 62/314,202, filed Mar. 28, 2016, the contents of which are incorporated herein by reference.

TECHNICAL FIELD

The present disclosure relates to methods, devices, systems, and computer-readable media for a multiband detector.

BACKGROUND

It is desirable to detect flames for early alarming of a fire. A typical method is that of triple-infrared (IR) which involves three detectors: one tuned to the 4.4 micrometer ($\mu$m) carbon dioxide emission band line (such emissions are formed when hydrocarbons burn) and the other two detectors are tuned to off-band lines, to discriminate between a flame and hot objects. These broadband detectors typically look at a 90 degree field of view, but are not capable of discerning individual sources of radiation within that field of view.

Another approach is to use an imager so that the camera can better discriminate between a flame and hot objects within the field of view. An imager makes it possible to see flames even when there are other hot objects in the field of view that are in different locations.

However, there are several potential problems with such a solution. For example, in some instances, the optics may get coated with debris, such as oil or soot) or an object may be in the way of the field of view. This can impair the viewing of a flame and/or its identification.

It is also desirable to look at objects in the field of view and discern whether these objects are emitted at 4.4 $\mu$m which may be an indicator of a flame, rather than just a hot item in the field of view. To do this currently requires the use of a filter wheel capturing separate images at the two spectral bands, but the moving parts associated with such filters can lead to failure.

Further, although the detectors can detect a flame, the detectors have no ability to locate the flame with respect to other objects in the area of the field of view, so a system like this can identify that there is a flame, but not its location.

DETAILED DESCRIPTION

Figure 1:
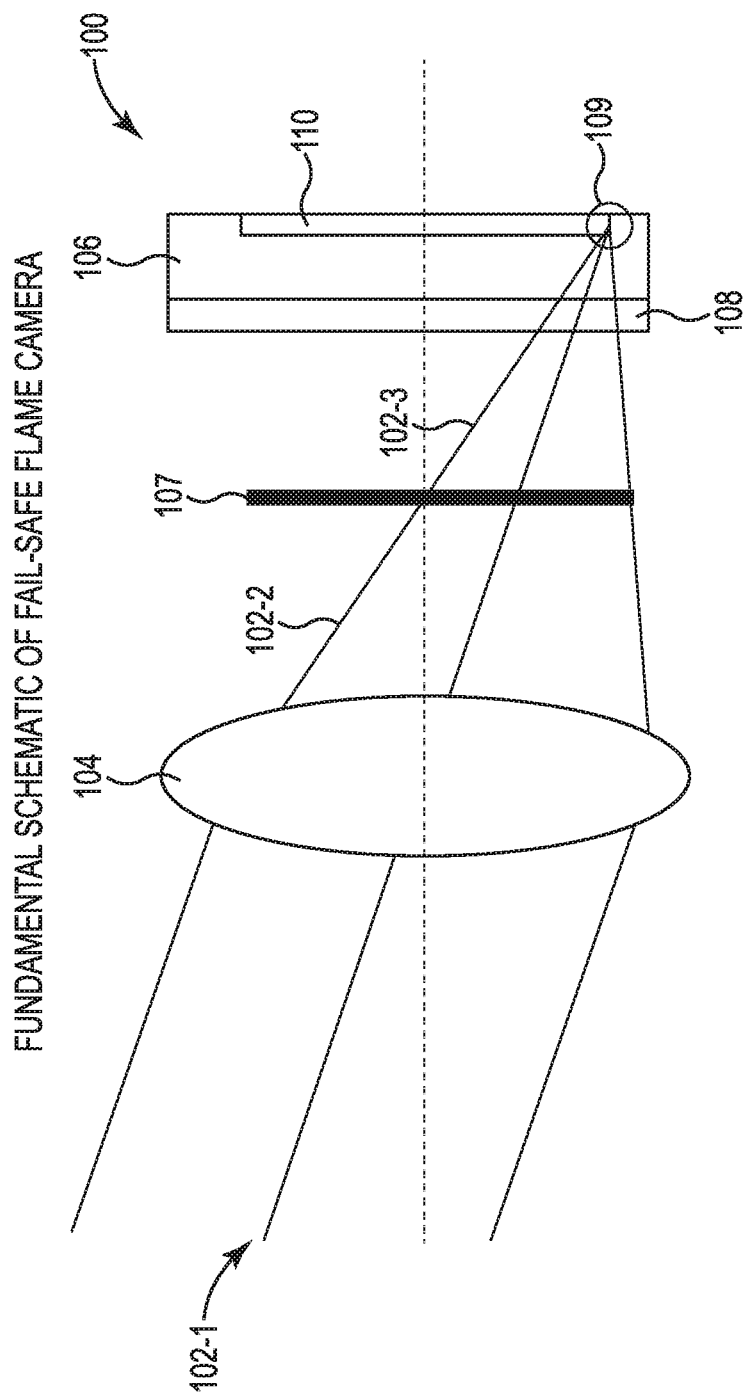
FIG. 1 is an example of a system for a multiband detector according to one or more embodiments of the present disclosure.

Devices, methods, systems, and computer-readable media for a multiband detector are described herein. One or more embodiments include a multiband detector designed to detect an emission source including a broadband lens, a broadband detector, and a filter that allows electromagnetic radiation entering the system to be filtered into at least two wavelength bands before contacting the broadband detector wherein one or more wavelength bands are used to determine system functionality and wherein one or more other wavelength bands are used to identify the presence of an emission source of having a characteristic particular wavelength or wavelength range.

The multiband detector as described herein is capable of detecting at least two spectral bands in order to detect a flame with one band and to provide a secondary function with one or more other bands. As used herein, a wavelength band is a group of desired wavelengths or wavelengths around a desired wavelength, such as around 4.4 micrometers, for example, while a wavelength range is a range of wavelengths within the electromagnetic spectrum (e.g., MWIR or LWIR wavelength ranges or wavelength ranges emitted by a source). Also as used herein the MWIR range includes wavelengths between 3-5 micrometers and the LWIR range includes wavelengths 8 micrometers and above.

As indicated above, some of the functions that can be provided include: to determine the presence of an emission source (e.g., a flame) having a characteristic particular wavelength (e.g., 4.4 micrometers, is characteristic of a hydrocarbon based flame) or wavelength range (e.g., 4.1 to 4.7 micrometers, can be defined as indicative of a hydrocarbon flame), determine a location of a number of emission sources, and/or determine a detection problem with the system or an object in the field of view as discussed above.

Any suitable broadband detection array can be used as the broadband detector. For example, an array that can detect at least two desired imaging bands (i.e., radiation wavelength ranges) can be utilized.

In some embodiments, a bolometer can be used to provide the broadband detector. Using a bolometer can be beneficial, for example, because it is a low cost device that will provide the necessary broadband characteristics for use as a broadband detector.

In various embodiments, the broadband detector array is a bolometer that operates over mid-wavelength infrared (MWIR) and long wavelength infrared (LWIR) bands. Further, in some such embodiments, the lens can be a MWIR-LWIR transmitting lens.

In some embodiments, the filter allows a first wavelength band within a MWIR and a second wavelength band within a LWIR to pass through the filter to the detector.

As discussed herein, in some embodiments, the emission source is a flame and the multiband detector system can be used as a flame detector. This can be accomplished, for example, by utilizing a filter wherein one of the at least two wavelength bands that passes through the filter includes 4.3 micrometers or 2.7 micrometers.

In some embodiments, the broadband detector can detect (e.g., sense, etc.) wavelength bands within the mid-wavelength infrared (MWIR) and wavelength bands within the long wavelength infrared (LWIR). That is, the dual band broadband detector can detect one or more specific bands within the MWIR and one or more specific bands within the LWIR.

The multiband detector as described herein can include a common lens and the resultant field of view (FOV) will be the same when viewing the LWIR and the MWIR data. This can be beneficial, for example, in identifying the location of a flame with respect to other items within the FOV as the viewpoints of the sets of data will be the same. In some embodiments, the lens can be a wide FOV MWIR-LWIR lens. This can allow for the detector to monitor a larger area, among other benefits.

In some embodiments, the multiband detector can include a single MWIR-LWIR filter that can include a number of wavelength bands within the MWIR and a number of wavelength bands within the LWIR to allow designated ranges within the MWIR and LWIR to pass through the filter to the broadband detector. In various embodiments, the multiband detector can include one or more MWIR filters and one or more LWIR filters or one or more MWIR-LWIR filters.

In some embodiments, each pixel in the broadband detector can detect both the MWIR and LWIR wavelength ranges. This can be beneficial, for example because it allows a composite image formed from both the MWIR and LWIR data and thereby allowing a viewer or the computing device to better identify the location of the flame with respect to other items in the field of view.

In various embodiments, the multiband detector can detect the MWIR emissions from a flame on a pixel by pixel basis. This can be beneficial because a flame may be small, but could be detected by such embodiments. Another benefit is that the system could identify multiple flame sources based on the pixel data.

In some embodiments, the filter can allow specific wavelength ranges to pass through to the filter. For example, in some embodiments, the specific wavelength ranges can correspond to one or more unique flame emission wavelengths or wavelength ranges within the MWIR (e.g., carbon dioxide at 4 micrometers, hydrogen flame at 2.7 micrometers, or ranges such as 3.8-4.2 micrometers for a carbon dioxide flame and 2.2-3.2 micrometers for a hydrogen flame, etc.). If one or more ranges are used, the range can be determined based on whether the range will suitably identify the flame with respect to other items that may emit radiation within that range.

In some embodiments, the filter can be utilized to block MWIR radiation from other sources (e.g., sun, etc.). In addition, the LWIR can be received by the broadband detector to ensure that the multiband detector is functioning properly.

For example, the LWIR can be utilized to provide a failsafe for the multiband detector if the detector is malfunctioning or if the lens has become obscured for some reason. For instance, if the MWIR range is not detecting a flame, the LWIR data can be checked to see if the detector is detecting something. If it is also not detecting anything, then the lens may be obscured or there may be another problem with the system and someone should be alerted to communicate via a computing device or initiate a physical inspection to check the system. It may also be that the detector is being saturated with data which can be identified by the system and addressed in a similar manner to the process described above.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit corresponds to the drawing figure number and the remaining digits identify an element or component in the drawing. Similar elements or components between different figures may be identified by the use of similar remaining digits.

As used herein, "a" or "a number of" something can refer to one or more such things. For example, "a number of devices" can refer to one or more devices. Additionally, the designator "N", as used herein, particularly with respect to reference numerals in the drawings, indicates that a number of the particular feature so designated can be included with a number of embodiments of the present disclosure.

FIG. 1 is an example of a system 100 for a multiband detector according to one or more embodiments of the present disclosure. In some embodiments, the system 100 can include a lens 104, a filter 107, and a broadband detector 106. In some embodiments, the broadband detector 106 can include a broadband detector window 108 and a broadband detector array 110. In some embodiments, the broadband detector array 110 can be coupled to a computing device (e.g., computing device 330 as referenced in FIG. 3).

In some embodiments, radiation 102-1 consisting of a plurality of wavelengths (e.g., all wavelengths, background radiation source, radiation source, flame source, etc.) can be received by the lens 104. The radiation 102-1 can includes MWIR and LWIR wavelengths, as described herein. In some embodiments, the lens 104 can be a wide field of view (FOV) MWIR-LWIR lens. In some embodiments, the lens 104 can focus the received radiation 102-1 at filter, as radiation 102-2.

In some embodiments, the filter 107 can be a filter with designated wavelength bands. In some embodiments, the designated wavelength bands can include wavelength bands for designated wavelength ranges.

For example, the filter 107 can include designated bands to allow specific wavelength ranges to pass through the filter. In some embodiments, the specific wavelength ranges can correspond to unique flame emission wavelengths within the MWIR (e.g., carbon dioxide at 4 micrometers, hydrogen flame at 2.7 micrometers, etc.) or ranges, as discussed above. The filter 107 can be used, to block particular wavelength ranges from the radiation 102-2 and allow radiation 102-3 to pass through the filter 107.

As described herein, the filter 107 can include designated wavelength bands within the MWIR and designated wavelength bands within the LWIR or the filters could be separate components, with one handling a first set of wavelengths (e.g., MWIR) and one or more others handling other wavelengths (LWIR). In some embodiments, the bands within the MWIR can be utilized by the broadband detector array 110 to identify a number of flames over a wide field of view. For example, the flames can be primarily combustion of one or more of: carbon dioxide, methane, propane, propylene gas, Volatile Organic Compound (VOC) and/or hydrogen.

In some embodiments, the filter 107 can be configured such that the transmittance of the MWIR bands and the LWIR bands are matched with the dynamic range of the broadband detector array 110. For example, the transmittance of filter 107 (what wavelengths are allowed to pass through the filter) can be configured to be uniform across all spectral bands (e.g., approximately 1.0) for a low dynamic range broadband detector (e.g., 8 or 10 bits resolution). In this manner, the image may be granular, but the items (flame and/or other items in the FOV) can be identified.

In some embodiments, the transmittance of the bands including LWIR and MWIR are purposely designed to have different transmittance levels. This can be particularly useful for a high dynamic range broadband detector, such as one with 14 bits or more in each sensing element or pixel. The filter 107 can enable direct relationships between specific intensity ranges and the radiation from each pass band.

For example, a 6000-7000 intensity range of raw detector counts can correspond to radiation of a hydrogen carbon flame (HC) at 4.4 micrometers and a 1000-2000 intensity range can be due to LWIR broadband of background at 300K. Other intensity ranges to spectral bands pair can include, for example: 3000-4000 for a hydrogen flame (H2), 4000-6000 for a H2+LWIR background, 7000-9000 for a hydrocarbon (HC)+LWIR background, 9000-11000 for HC+H2, and a 10000-13000 for HC+H2 flame+LWIR background.

In some embodiments, the filter 107 can be configured to be in front of the lens 104. This can be beneficial in applications where the same multiband detector may be used to detect different things. In such embodiments, one filter that is designed to pass one or more particular wavelengths or wavelength ranges can be interchanged with another filter designed to pass one or more different particular wavelengths or wavelength ranges. As discussed above, a single or multiple filters may be used in the embodiments of the present disclosure and in some embodiments, one or more of the filters may be removable and/or interchanged with other filter types. Further, in some embodiments, filters that are between the lens and the detector can be removed and or interchanged (e.g., a slit or door may be placed in a housing having the filter therein and the filter may be removed among other removal designs).

The input radiation 102-1 can be filtered by filter 107, which passes the radiation 102-2 having two or more designated wavelengths. Lens 104 can focus the radiation 102-2 to the detector 106 as radiation 102-3.

In some embodiments, the system 100 can include a broadband detector 106 that has a housing to encase the broadband detector array 110. In some embodiments, the broadband detector 106 can utilize a window 108 to allow radiation 102-3 to pass through to the broadband detector array 110. In some embodiments, the window 108 can be transparent to MWIR-LWIR to allow both MWIR and LWIR wavelengths through to the broadband detector array 110.

In some embodiments, the broadband detector 106 can include a broadband detector array 110 that is coupled to a computing device. Such embodiments are beneficial, for example, because additional functions can be provided by the computing device based on analysis of the data from the detector array.

In some embodiments, the broadband detector array 110 can be a focal plane array that provides a relatively high dynamic sensitivity range. In some embodiments, the broadband detector array 110 can be a bolometer that can include a dynamic range of 12 to 14 bit pixels or values ranging from 0 to 4096 or 0 to 16384, respectively. In some embodiments, the broadband detector array 110 can have a relatively flat response across a broad spectrum of wavelengths.

In some embodiments, the LWIR region of the received radiation 102-3 can be utilized as a failsafe for the system 100. In some embodiments, the LWIR region of the received radiation 102-3 can be thermal wavelengths of the FOV. In various embodiments, the LWIR region of the received radiation 102-3 can be utilized to ensure that the system 100 is functioning properly.

For example, when the broadband detector array 110 does not detect any flames via the MWIR as described herein, the LWIR region can be utilized to ensure that the broadband detector array 110 is functioning. In this example, the broadband detector array 110 may not detect flames via the MWIR due to a malfunction instead of a lack of flames in the area. Such failsafe functionality can be accomplished in this manner because there should always be LWIR radiation from any object of a reasonable ambient temperature.

In various embodiments, the LWIR region of the received radiation 102-3 can be utilized to identify a number of failure modes (e.g., obstructions between the radiation 102-1 and the broadband detector array 110, etc.). In some embodiments, the number of failure modes can include, but are not limited to: oil, soot, or other residue on the lens 104, a stationary or moving object that is partially or completely blocking the FOV, residue on the window 108 or filter 107, among other causes that can block or alter the radiation 102-1 from reaching the broadband detector array 110.

In some embodiments, the broadband detector array 110 can be a two dimensional (2D) array. In some embodiments, the lens 104 can focus the radiation 102-1 onto only a few pixels of the broadband detector array 110. For example, the lens 104 can focus the radiation 102-1 through the filter 107 and to the pixels within area 109 of the broadband detector array 110. This can be beneficial, for example, to reduce the size of the array or to allow other parts of the array to be used for other functions, among other benefits.

In previous systems and methods, the wavelengths were focused onto a single detector that observed an entire FOV. In some embodiments of the present disclosure, the broadband detector array 110 can be designed to detect only wavelengths transferred through the filter 107. That is, only the wavelength bands allowed to pass through the filter 107 are detectable by the broadband detector array 110. In some embodiments, the broadband detector array 110 may not be able to analyze the spectral makeup of the radiation 102-3, but may be able to identify when particular wavelengths within the radiation 102-3 are present (e.g., it can indicate of a flame is present or not, but the data is not analyzed beyond that indication).

In some embodiments, the broadband detector array 110 can be utilized to notify a user of the system 100 that there has been a failure. As described herein, the failure can be a malfunction of the broadband detector array 110, an obstruction or interference blocking the radiation 102-1, or other malfunction of the components of the system 100 that can interrupt the functionality of the broadband detector array 110. The absence of LWIR or a significant change in the LWIR background signal or imagery (this can be determined by comparison of data sets from the detector from different moments in time to identify changes between the data sets) can indicate a system failure.

Figure 2:
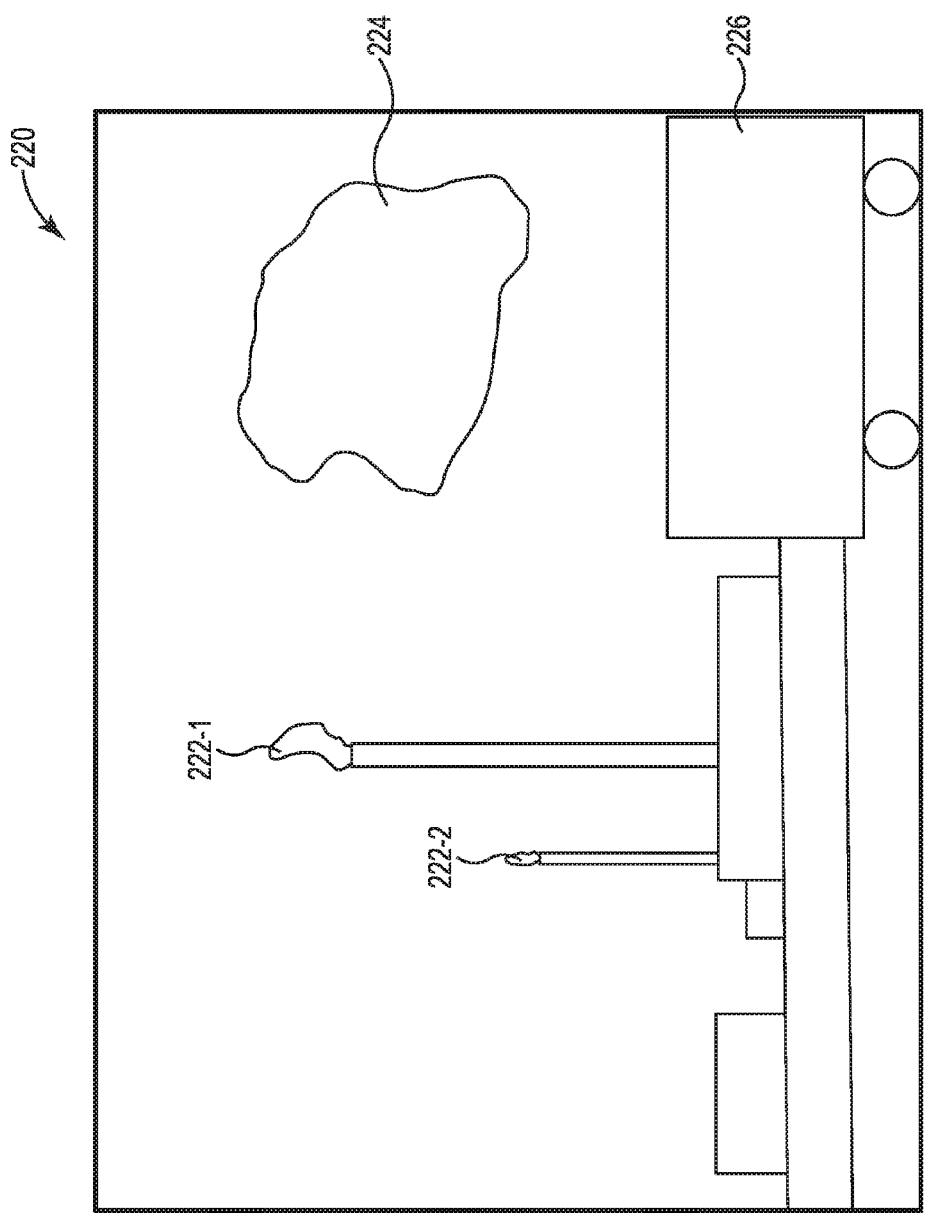
FIG. 2 is an example of a field of view for a multiband detector according to one or more embodiments of the present disclosure.

FIG. 2 is an example of a field of view 220 for a multiband detector according to one or more embodiments of the present disclosure. In some applications of the embodiments of the present disclosure, the field of view 220 can, for example, be an area of an oil refinery or other area that includes a number of flames 222-1, 222-2. As described herein, a number of obstructions 224, 226 can be within the field of view 220.

In previous systems and methods, narrow bands of MWIR are used for detection of flames. In the absence of a flame, the received narrow band MWIR radiation is low, resulting in little or no signal. The number of obstructions 224, 226 could block radiation from reaching the detector resulting in little or no signal. Thus, previous detectors had no way to differentiate between a blocked broadband detector and a normal situation with no flame. Thus, the previous detector systems could not indicate that there are no flames within the field of view 220 when the broadband detector was blocked.

In some embodiments, the multiband detector as described herein can identify the number of obstructions 224, 226 utilizing the received LWIR from the field of view 220. Broadband detector array 110 outputs intensity, $I_{tot}$ (t) of the radiation 102-3, which consists of narrow bands of MWIR and broad band of LWIR at time t. (i.e., $I_{tot}$ (t)=$I_{MWIR}$ (t)+$I_{LWIR}$ (t)).

In the presence of flames, $I_{MWIR}$ (t) is significantly bigger than $I_{LWIR}$ (t). While $I_{tot}$ (t) is approximately equal to $I_{MWIR}$ (t).

In some embodiments, this can be utilized to detect flames. In the absence of a flame, the sensed intensity consists of the LWIR radiation of the FOV. An obstruction causes $I_{tot}$ (t) to be zero or significantly lower (e.g., oil on the lens) than the normal LWIR intensity at previous time, $I_{LWIR}$ (t0). Major changes between $I_{LWIR}$ (t0) and $I_{LWIR}$ (t1) can indicate a failure mode of the system 100 as referenced in FIG. 1.

For example, the obstruction 224 can be a residue (e.g., oil, dust, mud, etc.) that is on a lens of the multiband detector. In this example, the multiband detector can identify an obstruction 224 on the lens and notify a user of the obstruction due to a decrease in $I_{tot}$ (t).

In another example, the obstruction 224 can be a vehicle that has parked in front of the multiband detector blocking the field of view 220. In this example, the multiband detector can identify the obstruction 226 and notify a user of the obstruction.

In some embodiments, the field of view 220 can include desired flame sources 222-1 and undesired flame sources 222-2. For example, the desired flame sources 222-1 can include controlled flames within an oil refinery. The desired flames can be flames that are utilized to burn off excess materials. In another example, the undesired flame sources 222-2 can be unintended flames that can cause damage to the oil refinery. In some embodiments, the desired flames can be identified and ignored through use of instructions executed by the computing device when analyzing the data from the detector.

In some embodiments in which the broadband detector array 110 is a 2D focal plane array (e.g., bolometer), the bands within the MWIR can be utilized to identify desired flames (e.g., controlled flames) and undesired flames (e.g., uncontrolled flames). The intensity output from the broadband detector array 110 is not the intensity of the total radiation from the FOV, but is spatially distributed, which can be represented as: $I_{tot}$ (t,x,y)=$I_{MWIR}$ (t,x,y)+$I_{LWIR}$ (t,x,y), where x,y is a pixel location corresponding to an instantaneous field of view.

Detection of flame can be localized based on the x, y locations. Locations of known desired flame sources can be specified by users. Further analyses can compute the characteristics of the flame via the computing device including, but not limited to: the size, shape, and/or intensity distribution. With user designated locations of desired flames, the desired flames can be ignored from the detected flames, thus not alarming users of their presence.

Similarly, the locations of obstructions can be identified using a 2D broadband detector array 110. Partial or complete obstruction can be determined based on the size of the detected obstruction. Further analyses can characterize the obstructions including, but not limited to: the type, shape, and/or intensity distribution. The nature of the obstruction, e.g., smearing on the lens vs an oil tanker truck, can be classified and used in the analysis of data by the computing device or for other functions of the system.

By identifying the number of obstructions 224, 226, unnecessary repairs of the multiband detector can be avoided. For example, identifying the number of obstructions 224, 226 can be utilized to identify a cause of failures. In some embodiments, the field of view 220 can include a number of flame sources 222-1, 222-2. Identification of the failure can also aid in getting the proper response to such a failure (e.g., getting a technician to clean the lens, getting someone to move the truck).

Figure 3:
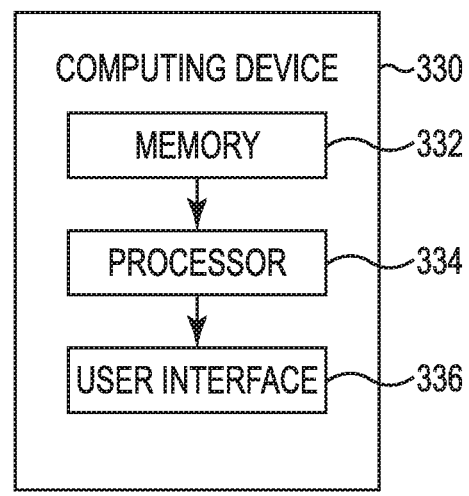
FIG. 3 is an example of a diagram of a computing device for a multiband detector according to one or more embodiments of the present disclosure.

FIG. 3 is an example of a diagram of a computing device 330 for a multiband detector according to one or more embodiments of the present disclosure. Computing device 330 can be, for example, an embedded controller as described herein, among other types of computing devices.

As shown in FIG. 3, computing device 330 includes a memory 332 and a processor 334 coupled to memory 332. Memory 332 can be any type of storage medium that can be accessed by processor 334 to perform various examples of the present disclosure. For example, memory 332 can be a non-transitory computer readable medium having computer readable instructions (e.g., computer program instructions) stored thereon that are executable by processor 334 to determine a deployment of an access control system in accordance with one or more embodiments of the present disclosure.

Memory 332 can be volatile or nonvolatile memory. Memory 332 can also be removable (e.g., portable) memory, or non-removable (e.g., internal) memory. For example, memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 332 is illustrated as being located in computing device 330, embodiments of the present disclosure are not so limited. For example, memory 332 can also be located internal to another computing resource (e.g., enabling computer readable instructions to be downloaded over the Internet or another wired or wireless connection).

As discussed herein, a computing device can be in communication with the broadband detector to provide a fail safe function which determines whether the system is operating correctly based on data received from the broadband detector. The data received can, for example be sense data from sensors that are arranged in an array to form the detector.

The data can be transferred from the detector array to the computing device. This data can then be analyzed, for example, by executable instructions stored in memory to determine whether an emission source is present in the FOV, the location of the emission source, and/or whether the system is working properly (i.e., fail safe function), among other functions.

In some embodiments, the fail safe function is based on a wavelength band within the LWIR wavelength range and the emission source can be identified based on the MWIR wavelength range data. In this manner, the computing device can process both types of data and can provide both functions, in some embodiments. In addition to analysis, the computing device can also include executable instructions to alert a user of a system failure based on the determination of whether the system is operating correctly.

As shown in FIG. 3, computing device 330 can also include a user interface 336. User interface 336 can include, for example, a display (e.g., a screen, an LED radiation, etc.). The display can be, for instance, a touch-screen (e.g., the display can include touch-screen capabilities). User interface 336 (e.g., the display of user interface 336) can provide (e.g., display and/or present) information to a user of computing device 330.

The display can be used to view the data from the broadband detector. For example, the computing device can receive the data and instructions can be executed to show the received data on the display. In some embodiments, the display can be used to view the MWIR and LWIR data separately, and in some embodiments, the data can be viewed at the same time on the display. Further, as discussed herein, executable instructions can be used to exclude certain areas of data (e.g., desired flames) from the display or from having an alert or alarm initiated.

Additionally, computing device 330 can receive information from the user of computing device 330 through an interaction with the user via user interface 336. For example, computing device 330 (e.g., the display of user interface 336) can receive input from the user via user interface 336. The user can enter the input into computing device 330 using, for instance, a mouse and/or keyboard associated with computing device 330, or by touching the display of user interface 336 in embodiments in which the display includes touch-screen capabilities (e.g., embodiments in which the display is a touch screen).

As used herein, "logic" is an alternative or additional processing resource to execute the actions and/or functions, etc., described herein, which includes hardware (e.g., various forms of transistor logic, application specific integrated circuits (ASICs), etc.), field programmable gate arrays (FPGAs), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A multiband detector system designed to detect an emission source, comprising:
   a broadband lens;
   a broadband detector; and
   a filter that allows electromagnetic radiation entering the system to be filtered into at least two wavelength bands before contacting the broadband detector wherein one or more wavelength bands are used to determine system functionality and wherein one or more other wavelength bands are used to identify the presence of an emission source having a characteristic particular wavelength or wavelength range.

2. The system of claim 1, where the detector is a bolometer that operates over mid-wavelength infrared (MWIR) and long wavelength infrared (LWIR) bands and wherein the lens is a MWIR-LWIR transmitting lens.

3. The system of claim 1, wherein the filter allows a first wavelength band within a MWIR and a second wavelength band within a LWIR to pass through the filter to the detector.

4. The system of claim 3, wherein the emission source is a flame.

5. The system of claim 1, wherein a computing device can be in communication with the broadband detector to provide a fail safe function which determines whether the system is operating correctly based on data received from the broadband detector.

6. The system of claim 5, wherein the computing device provides an emission detection function which determines whether the presence of an emission source having characteristics in first wavelength band based on data received from the broadband detector.

7. The system of claim 5, wherein the computing device alerts a user of the presence of the emission source and a system failure based on the determination of whether the system is operating correctly.

8. The system of claim 1, wherein the one of the at least two wavelength bands is 4.3 micrometers or 2.7 micrometers.

9. A system for a multiband detector, comprising:
   a lens;
   a filter to allow a first wavelength band of electromagnetic radiation within a mid-wavelength infrared (MWIR) range and a second wavelength band of electromagnetic radiation within a long wavelength infrared (LWIR) range;
   a broadband detector to receive the first and second wavelength bands from the filter; and
   a computing device coupled to the broadband detector to provide emission source detection based on the received transmitted radiation from the first wavelength band within the MWIR range and a fail safe operation based on the received transmitted radiation from the second wavelength band within the LWIR range.

10. The system of claim 9, wherein the broadband detector is a bolometer that detects both the first and second wavelength bands at each pixel of the bolometer.

11. The system of claim 9, comprising an imaging lens coupled to the filter.

12. The system of claim 9, wherein the filter includes a narrow band transmission between 4.3 and 4.7 micrometers (μm).

13. The system of claim 9, where a filter spectral transmission is set such that the first wavelength band of electromagnetic radiation from an emission source has a different intensity than the second wavelength band of electromagnetic radiation used to determine a fail safe condition and thus provides the basis for distinguishing one or more emission sources from the radiation used for fail safe determination based on intensity.

14. The system of claim 9, wherein the LWIR of the received transmitted radiation is utilized by the computing device to determine an existence of obstructions between the radiation and the broadband detector.

15. A system for a multiband detector, comprising:
a lens to receive radiation from a field of view for an area;
a filter to receive radiation from the lens, wherein the filter allows a first wavelength band within a mid-wavelength infrared (MWIR) and a second wavelength band within a long wavelength infrared (LWIR) to pass through the filter;
a broadband detector to receive transmitted wavelengths from the filter; and
a computing device coupled to the broadband detector to provide a fail safe operation based on the received transmitted radiation from the second wavelength band within the LWIR by determining an existence of obstructions of radiation received by the lens.

16. The system of claim 15, wherein the MWIR received by the broadband detector is utilized by the computing device to identify a number of flames over the complete field of view.

17. The system of claim 15, wherein the broadband detector comprises a two dimensional (2D) detector array.

18. The system of claim 15, wherein the computing device determines an obstruction on the lens based on the received transmitted radiation from the second wavelength band within the LWIR.

19. The system of claim 15, wherein the computing device determines when an obstruction exists on the lens when the computing device determines an absence of LWIR received at the broadband detector.

20. The system of claim 15, wherein the computing device determines a functionality of the system based on the received transmitted radiation from the second wavelength band within the LWIR.

\* \* \* \* \*